March 31, 1931. F. E. LE BARON 1,799,051
EMULSIFYING DEVICE
Filed Sept. 9, 1929    2 Sheets-Sheet 1

INVENTOR
FRED EVERETT LE BARON.
BY
Shreve, Crow & Gordon
ATTORNEYS

March 31, 1931.   F. E. LE BARON   1,799,051
EMULSIFYING DEVICE
Filed Sept. 9, 1929   2 Sheets-Sheet 2
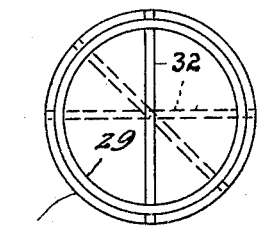
FIG. 7
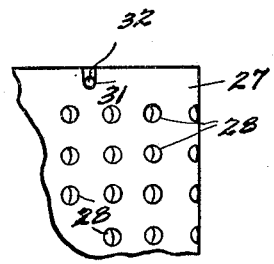
FIG. 8
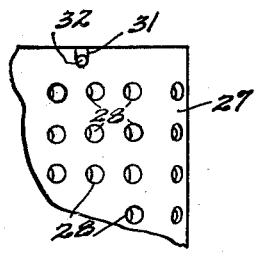
FIG. 9
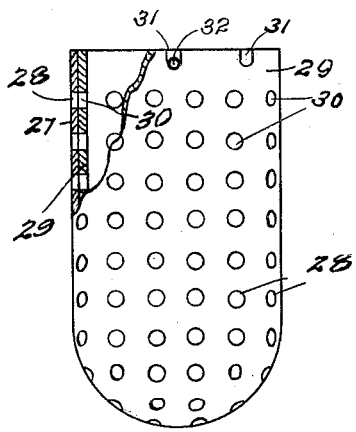
FIG. 6
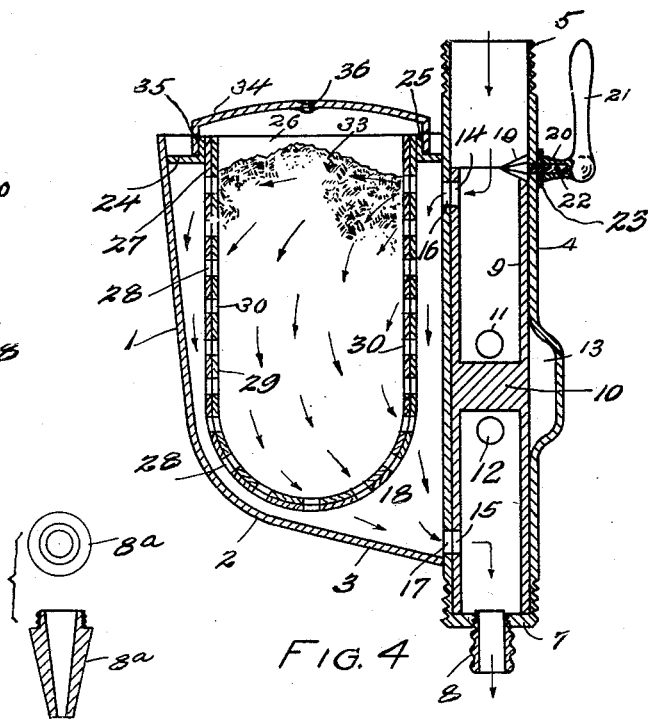
FIG. 4
FIG. 5
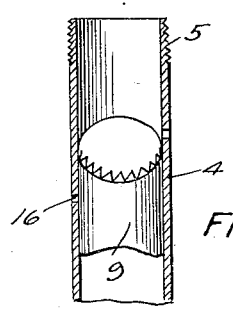
FIG. 10
INVENTOR.
FRED EVERETT LE BARON.
BY
Shreve, Crowe & Gordon
ATTORNEYS Patented Mar. 31, 1931

1,799,051

UNITED STATES PATENT OFFICE

FRED EVERETT LE BARON, OF ATLANTA, GEORGIA

EMULSIFYING DEVICE

Application filed September 9, 1929.  Serial No. 391,481.

Generically, this invention relates to liquid dispensing devices, but it more especially comprehends the type adapted to be inserted in a pipe or hose line to interrupt and control the flow of water or other fluid therethrough, or to emulsify or mix the water or other fluid with the contents of the device during its passage therethrough.

One of the principal objects of this invention is the provision of a device of the above character, provided with a valve-controlled conduit, forming a continuation of the hose or pipe line, and a reservoir communicating with said conduit, having a perforated container suspended in the reservoir, adapted to contain soap or other desired substance, and means in connection with the conduit to interrupt the flow of fluid therethrough, or to permit its passage without passing through said reservoir, or to direct its passage through said reservoir and container for emulsifying or mixing the contents as desired.

A further important object of this invention is the provision of an emulsifier or mixing device adapted to be mounted in a hose or pipe line formed with a valve controlled section constituting a continuation of the hose or pipe line and permitting the flow of clear water or other fluid therethrough and formed with a reservoir having a container for soap or other substance mounted therein, said reservoir having inlet and outlet openings communicating with said section, and means co-acting with said section, for cutting off and controlling the flow of water therethrough, and opening and closing said inlet and outlet openings, to permit its flow through said reservoir for mixing the fluid with the contents of said container, and means co-acting with said container for regulating the extent of the mixture of the contents with the water during its passage through said reservoir.

A further object of this invention is the provision of a device of this character for containing soap or other substance, adapted to be mounted either in a pipe-line or in a portable hose line whereby clear water is directed through such device or by-passed through the reservoir containing the soap or other substance to be mixed therewith and having means to instantly effect discharge of clear water therefrom or water mixed with the substance contained thereby, as desired, said device being adapted for utilization in connection with shower-baths, bath-tubs, wash basins, kitchen sinks and the like.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 4 is a vertical sectional view of the device;

Fig. 5 is a vertical section of a modified form of discharge-nozzle;

Fig. 6 is a side elevation of the perforated container and holder, partly in section;

Fig. 7 is a top plan view of Fig. 6;

Fig. 8 is a fragmentary elevation of Fig. 6, showing the adjustment of the perforated container-cup and holder with perforations partially closed;

Fig. 9 is a similar view with perforations further closed; and,

Fig. 10 is a fragmentary detailed perspective view of the tubular valve showing the rack teeth formed on its upper edge, and with a portion of the pipe member in section.

Figure 1:
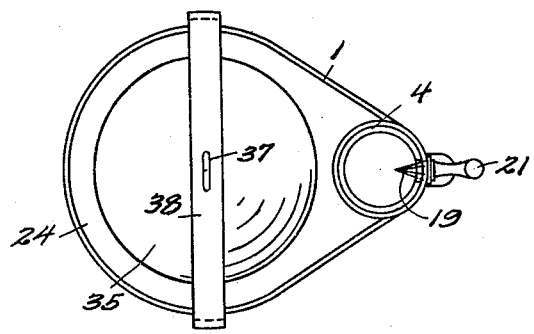
Fig. 1 is a top plan view of my improved emulsifier or mixer.
Figure 2:
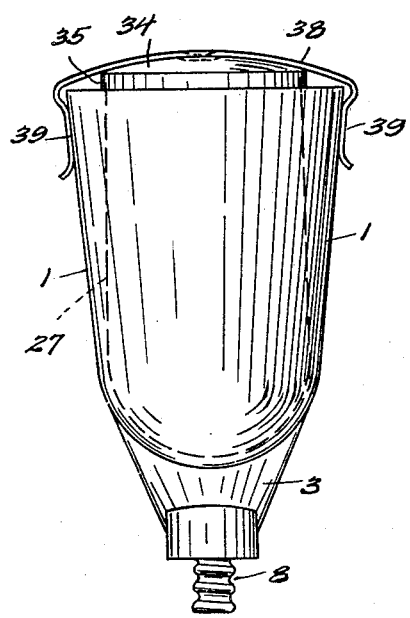
Fig. 2 is a front elevation of Fig. 1.

The devices of this general character with which I am familiar have proven deficient by reason of either complexity of construction, impractical manner of attachment to a hose-line, necessitating separate mounting, necessity of cutting off the flow of water at a separate point, not admitting of ready adjustment of the flow of water through the device, or of means for controlling the extent of the mixture during its passage therethrough; and it was to overcome the deficiencies of such devices and to provide a device adapted to be mounted in a pipe line without disturbing the normal operation thereof, yet constituting a section of said line, and having means to cut off and control the normal flow therethrough, and when it is desired, diverting the flow through the reservoir containing the substance to be mixed with the water or other fluid, and means for controlling the extent of the mixture, such device also being adapted for attachment to the free end of said pipe line, or portably mounted in a hose line for the washing of automobiles, windows, buildings, and the spraying of trees, etc., in addition to its more normal use for washing and rinsing purposes, and the like, that I designed the device forming the subject matter of this invention.

In the illustrated embodiment characterizing this invention there is shown a semi-triangular, flared casing 1, tapering downwardly and inwardly to a point as at 2, to form a chute-like bottom portion 3 and with an integral pipe section 4, extending through said device and forming the end-wall portion thereof, said section having its upper end extending above the casing 1, and threaded as at 5, and its lower end extending below the bottom portion, and externally threaded as at 6. In the present instance, section 4 is formed with a bottom portion 7, suitably apertured and internally threaded to receive the threaded nozzle 8.

Figure 3:
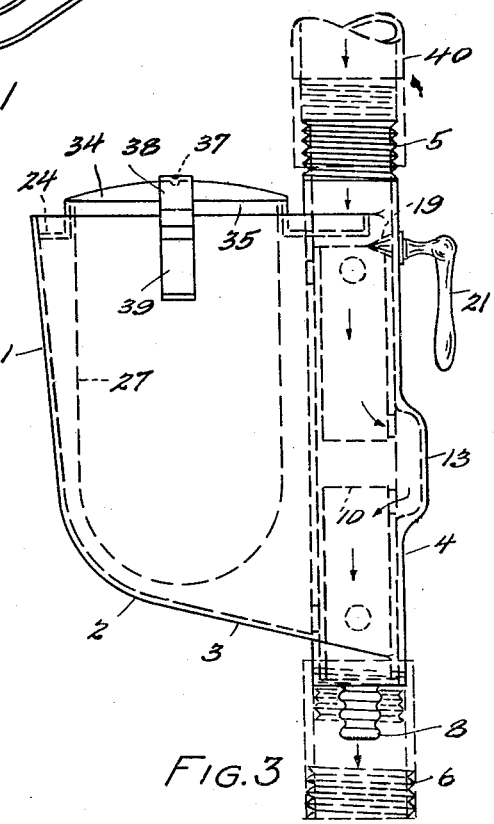
Fig. 3 is a diagrammatic side elevation of Fig. 2.

Telescopically mounted within section 4 is a tubular valve 9, with its lower end adapted to seat on bottom 7, and is formed with a centrally disposed partition wall 10, and above and below said partition with by-pass inlet and outlet openings 11 and 12, respectively, said openings adapted to communicate with by-pass 13 formed in the outer wall of section 4, as shown in Figure 3, to permit passage of water or other fluid therethrough, and by actuation of valve member 9, adapted to be removed from communication therewith, as shown in Fig. 4, and for a purpose which will hereinafter more fully appear. Said valve member 9 is formed at its upper and lower ends adjacent to the top and bottom of casing 1, with inlet and outlet openings 14 and 15, respectively, positioned at right angles to openings 11 and 12, and adapted to be brought into and out of registration with reservoir inlet and outlet openings 16 and 17, respectively, to permit the passage of water through said inlet openings 14 and 16 into the reservoir 18 and its discharge through outlet openings 15 and 17, as clearly shown in Fig. 4 of the drawings, and when said valve 9 is so positioned, inlet and outlet openings 11 and 12 will be out of communication with by-pass 13 as will be hereinafter more fully explained.

In order to operate valve 9, as above explained, the upper edge of said tubular valve member is formed with teeth, adapted to conform to the configuration of and mesh with the conical gear 19 mounted on the inner end of gearshaft 20 extending through section 4 and having suitably mounted on its exterior end handle 21 secured thereon by pin 22, and with spring washer 23 mounted on said shaft intermediate section 4 and handle 21.

The reservoir 18 is provided with an integrally or suitably connected top portion 24, provided with a vertical flange 25, surrounding opening 26 and suitably secured to said flange is a cup-like holder 27 suspended within said reservoir 18, and with its top edge flush with that of flange 25, said holder being formed throughout its surface area with a plurality of apertures 28, and a similarly shaped container 29 is adapted to telescopically seat in the said holder 27 and is formed with a corresponding plurality of apertures 30, adapted to normally register with apertures 28. The upper edges of holder 27 and container 29 are formed with a plurality of slots 31, adapted to receive a bar 32 for locking the container in position and preventing its rotation with respect to holder 27. The container may be rotated and the bar 32 positioned in different slots to effect a locking thereof, with its apertures 30, in any desired degree of registration with apertures 28 of the holder, thereby controlling the discharge of the soap or other suitable substance 33 therethrough, during the operation of the device, and as clearly shown in Figures 6, 7, 8, and 9 of the drawings.

A cover 34, formed with depending flange 35 adapted to embrace flange 25 and seat on reservoir top 24. Said cover 34 is provided with an indentation 36 adapted to receive lug 37, carried by spring clips 38, the end portions 39 of which are adapted to contact with the outer edge of the casing 1, maintaining said cover in closed position.

Where it is desired to increase the velocity of the discharge of the water or the mixture from the device, the tapered nozzle 8a, illustrated in Fig. 5 may be readily engaged in the bottom 7, in place of nozzle 8, heretofore described.

While the operation of the device would seem to be clear from the above description, yet it might be well to state that actuation of handle 21 revolves valve 9 and, when the handle 21 points down, the inlet and outlet openings 11 and 12 are in communication with by-pass 13, permitting the water or other liquid in the pipe or hose line 40, to flow through freely, without passing through reservoir 18 and mixing with the contents of container 29, as clearly shown in Fig. 3 of the drawings; and when the handle is actuated to point upwardly, the valve 9 will be revolved to bring into registration inlet openings 14 and 16, and outlet openings 15 and 17, and to close by-pass 13, so that the water will be directed through reservoir 18, mixed with the contents of container 29, and discharged through nozzle 8, as clearly shown in Fig. 4 of the drawings, and, when the handle is brought to rest in a horizontal position, the water or fluid supply will be entirely cut off from both reservoir 18 and by-pass 13, as will be clear without further explanation.

From the above it will be apparent that I have designed an emulsifying device of great utility, susceptible of a variety of uses, simple in construction, manufacturable at a negligible cost, and efficient for the purposes intended.

Although in practice I have found that the form of my invention illustrated in the accompanying drawings and referred to in the above description as the preferred embodiment, is the most efficient and practical, yet, realizing the conditions concurrent with the adoption of my invention will necessarily vary, I desire to emphasize that various minor changes in details of construction, proportion and arrangement of parts, may be resorted to within the scope of the appended claim without departing from or sacrificing any of the principles of this invention.

Having thus described my invention, what I desire protected by Letters Patent is as set forth in the following claim:

An emulsifying device comprising a conduit formed with a by-pass connected with a source of fluid supply, a reservoir having an inlet and outlet communicating with said conduit, a tubular valve member rotatable in said conduit, means carried by the conduit and co-acting with said tubular member for rotating said valve member to divert the fluid flow from said by-pass and into and out of said reservoir, a perforated container for a detergent substance supported in said reservoir, and means co-acting with said container for controlling the discharge of said substance therefrom.

This specification signed this 19th day of August, A. D., 1929.

F. E. LE BARON.